BEST AVAILABLE COPY
BEST AVAILABLE COPY

United States Patent [19]
Kawagoe

[11] 3,895,240
[45] July 15, 1975

[54] SET PREFERRING R-S FLIP-FLOP CIRCUIT

[75] Inventor: Hiroto Kawagoe, Tokyo, Japan
[73] Assignee: Hitachi, Ltd., Japan

[22] Filed: Jan. 22, 1974
[21] Appl. No.: 435,443

[30] Foreign Application Priority Data
Jan. 22, 1973 Japan .................................. 48-8685

[52] U.S. Cl. ................................. 307/279; 307/291
[51] Int. Cl. ......................... H03k 3/286; H03k 3/33
[58] Field of Search ........... 307/205, 214, 238, 279, 307/291; 328/48, 200, 206

[56] References Cited
UNITED STATES PATENTS

| | | | |
|---|---|---|---|
| 3,484,625 | 12/1969 | Booher | 307/205 X |
| 3,612,908 | 10/1971 | Heimbigner | 307/279 |
| 3,679,913 | 7/1972 | Foltz | 307/238 X |
| 3,753,009 | 8/1973 | Clapper | 307/291 X |

OTHER PUBLICATIONS

Fette, Dynamic Mos - A Logical Choice; EDN/EEE (pub.), 11/15/1971; pp. CH6–CH14.

*Primary Examiner*—Michael J. Lynch
*Assistant Examiner*—L. N. Anagnos
*Attorney, Agent, or Firm*—Craig & Antonelli

[57] ABSTRACT

A set preferring R-S flip-flop circuit constructed of insulated gate field-effect transistors, which comprises a flip-flop body including first and second inverter circuits coupled in cross connection, and a set input transistor connected on the input side of the flip-flop body. A reset input transistor is included in the flip-flop body and is used as a part thereof, so that the number of necessary transistors is reduced.

11 Claims, 7 Drawing Figures

FIG. 1
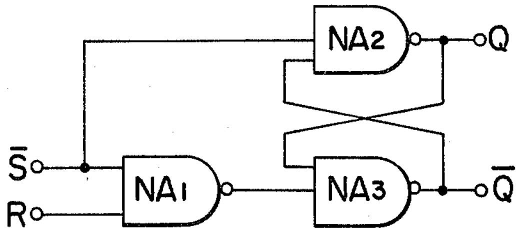
FIG. 2a
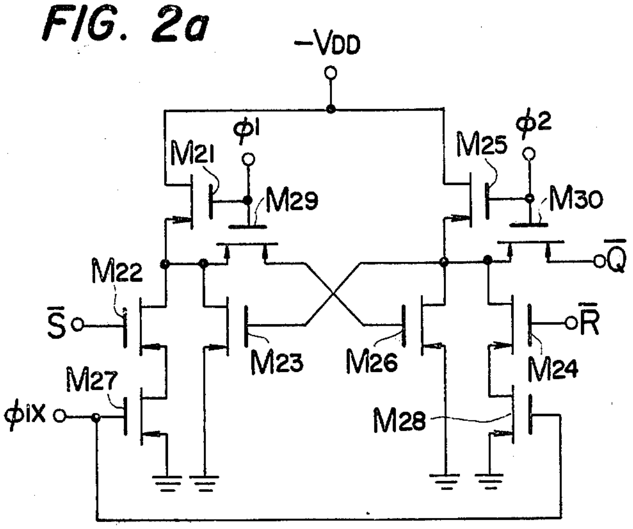
FIG. 2b
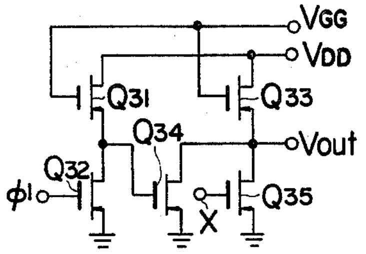
FIG. 2c
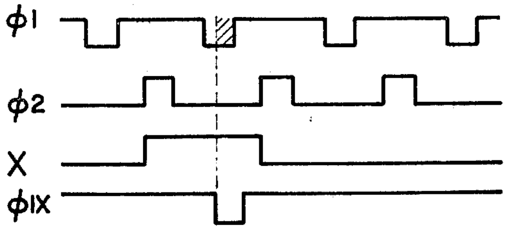
FIG. 3
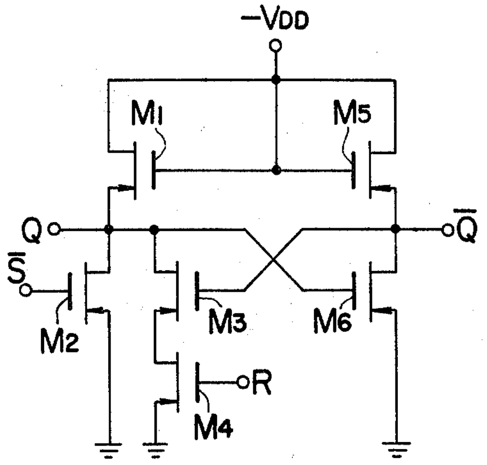
FIG. 4
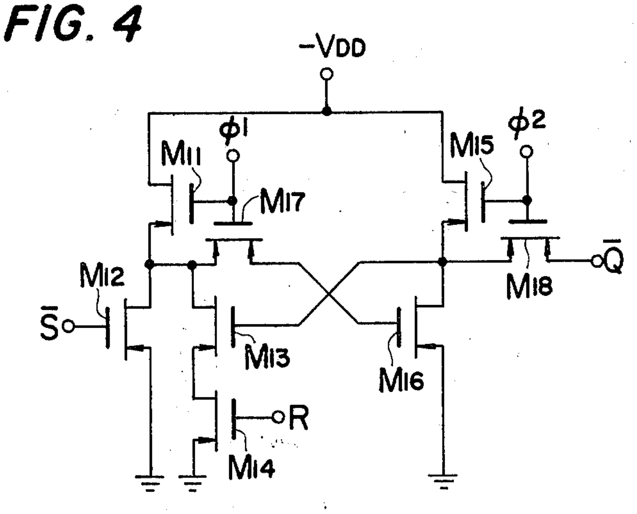
| S | S̄ | R | $\overline{Q_{n+1}}$ | $Q_{n+1}$ |
|---|---|---|---|---|
| 0 | 1 | 0 | $\overline{Q_n}$ | $Q_n$ |
| 0 | 1 | 1 | 1 | 0 |
| 1 | 0 | 0 | 0 | 1 |
| 1 | 0 | 1 | 0 | 1 |
FIG. 5

SET PREFERRING R-S FLIP-FLOP CIRCUIT

BACKGROUND OF THE INVENTION

1. Field of the Invention

The present invention relates to a flip-flop circuit, and more particularly to a set preferring R-S flip-flop circuit which is constructed of insulated gate field-effect transistors (hereinbelow, simply termed "transistors").

2. Description of the Prior Art

An R-S flip-flop circuit is a circuit having a logical function such that, when the set input S is 1 and the reset input R is 0, the output Q becomes 1; when S is 0 and R = 1, Q becomes 0; and when S = R = 0, the previous state is stored. Since, with this circuit, the state is not settled at S = R = 1, such an input condition is inhibited.

Unlike the standard R-S flip-flop circuit, a set preferring R-S flip-flop circuit (hereinafter called an "R-S-S flip-flop circuit") has the logical function such that at S = R = 1, the set input S is preferred so that the output Q is brought to the state 1. The R-S-S flip-flop circuit is accordingly suited for a circuit in which both the set input S and the reset input R can become 1, and in that case, a preference need be given to the set input S.

Examples of the R-S-S flip-flop circuit are illustrated in FIGS. 1 and 2*a* to 2*c*. FIG. 1 shows an R-S-S flip-flop circuit of the pure static type, which is composed of three 2-input NAND gates.

The number of transistors herein used is nine because three transistors are required for one 2-input NAND gate. On the other hand, a quasi-static type (delay type) R-S-S flip-flop circuit in FIG. 2*a* includes nine transistors $M_{21}$ – $M_{29}$ as indispensable ones. Thus, the prior art R-S-S flip-flop circuit requires nine or more transistors in either type of circuit.

In an electronic calculator and general digital control equipment, a flip-flop circuit of the delay type is required. The R-S-S flip-flop circuit in FIG. 2*a* as is employed for this purpose involves problems as stated below.

As shown in FIG. 2*b*, a clock control pulse $\phi_{1x}$ is produced by a logical circuit which consists of transistors $Q_{31}$ – $q_{35}$ and which receives a clock pulse $\phi_1$ and a control signal X as its input signals. In relation to the clock control pulse $\phi_{1x}$, therefore, the time during which the clock pulse $\phi_1$ and the clock control pulse $\phi_{1x}$ overlap, in other words, the time during which the transistors $M_{29}$ and $M_{27}$ and the transistors $M_{29}$ and $M_{28}$ in FIG. 2*a* are respectively held conductive simultaneously during the writing operation is shorter by the delay component of the logical circuit than the pulse width of the clock pulse $\phi_1$, as is indicated at an oblique line part in FIG. 2*c*.

The fact that the time of the simultaneous conduction of the transistors is short has the result that the time during which input signals S and R are written into the flip-flop circuit is short. This is the possible cause of a malfunction. For example, if the time of the simultaneous conduction of the transistors $M_{29}$ and $M_{27}$ is short, a malfunction may occur due to the relation among the discharge time constant of a circuit consisting of the transistors $M_{26}$, $M_{29}$, $M_{22}$ and $M_{27}$, a supply voltage $V_{DD}$, a voltage retained in the gate capacity of the transistor $M_{26}$, and the threshold voltage $V_{th}$ of the transistor $M_{26}$. If the simultaneous conduction time of the transistors $M_{28}$ and $M_{29}$ is short, a malfunction may take place due to the relation among the charging time constant of a circuit consisting of the transistors $M_{21}$, $M_{29}$ and $M_{26}$, the supply voltage $V_{DD}$, and the threshold voltage $V_{th}$ of the transistor $M_{26}$. In particular, the latter case at the charging is a serious problem, because the mutual conductance $g_m$ of the transistor $M_{21}$ is small and accordingly the time constant is large. In order to lengthen the time of the overlap between the clock $\phi_1$ and the clock control pulse $\phi_{1x}$, the pulse width of the clock pulse $\phi_1$ may be made sufficiently long. To this end, however, the clock frequency need be lowered, which inevitably makes the operating speeds of a shift register, etc., lower.

Besides, since the circuit in FIG. 2*a* uses the clock control pulse $\phi_{1x}$, the circuit in FIG. 2*b* for generating it is additionally required, and the number of the elements is further increased.

SUMMARY OF THE INVENTION

An object of the present invention is to provide an R-S-S flip-flop circuit which has a small number of required elements.

Another object of the present invention is to provide a delay type R-S-S flip-flop circuit which is free from the problem of malfunctions as previously stated with reference to FIGS. 2*a* to 2*c*.

In accordance with one aspect of the present invention, there is provided an R-S-S flip-flop circuit in which a transistor for resetting is provided in a flip-flop body, while a transistor for setting is connected on the input side of the flip-flop body. The transistor for resetting is used as a part of the flip-flop body in this manner, whereby the number of elements can be diminished.

BRIEF DESCRIPTION OF THE DRAWINGS

FIG. 1 is a schematic circuit diagram of a prior art, set preferring R-S flip-flop circuit of the pure static type;

FIG. 2*a* is a schematic circuit diagram of a prior art, set preferring R-S flip-flop circuit of the quasi-static type (delay type);

FIG. 2*b* is a schematic circuit diagram of a gate circuit for generating a clock control pulse employed in the prior art flip-flop circuit;

FIG. 2*c* is a waveform diagram of clock pulses employed in the circuits of FIGS. 2*a* and 2*b*;

FIGS. 3 and 4 are schematic circuit diagrams of pure static and quasi-static types of set preferring R-S-S flip-flop circuits according to the present invention, respectively, and FIG. 5 is a truth table of the embodiments of the present invention.

PREFERRED EMBODIMENTS OF THE INVENTION

FIG. 3 shows a pure static R-S-S flip-flop circuit according to the present invention.

Referring to the figure, a load transistor $M_1$ and driving transistors $M_3$ and $M_4$ are connected in series, and constitute the first inverter circuit (NOR circuit). Load transistors $M_5$ and $M_6$ constitute the second inverter circuit (NOT circuit). The output terminal of the first inverter circuit is connected to the input terminal of the second inverter circuit, namely, the gate electrode of the transistor $M_6$. The output terminal of the second inverter circuit is feedback-connected to the gate electrode of the transistor $M_3$ forming one of the input terminals of the first inverter circuit. To the gate electrode of the transistor $M_4$ forming the other input terminal of the first inverter circuit, a reset input signal R is applied. The first and second inverter circuits thus cross-connected constitute the body of the flip-flop circuit.

A driving transistor $M_2$ is an input transistor for setting the flip-flop and is connected to the external input terminal of the flip-flop body. That is, the transistor $M_2$ is connected between the output terminal of the first inverter circuit and ground. To the gate electrode of transistor $M_2$, the inverted signal S of a set input signal S is applied.

The operation of the flip-flop circuit thus constructed will now be explained with reference to a truth table in FIG. 5.

First, let's consider a case where the set input S is 1 (ground potential), while the reset input R is 0. Since the transistor $M_2$ is non-conductive and the transistor $M_4$ is conductive, the state of the flip-flop does not change, and the output $Q_{n+1}$ of the flip-flop circuit at this time is the same as the previous state $Q_n$.

Next, when the reset input R also becomes 1, both the transistors $M_2$ and $M_4$ become non-conductive. Therefore, the output of the first inverter circuit, namely, the output Q of the flip-flop becomes 0. Since, at this time, the transistor $M_4$ is nonconductive, the previous information having been stored in the gate capacitance of the transistor $M_3$ has no influence on the output Q, and the information 1 of the output Q is written into the gate capacitance of the transistor $M_3$.

When the set input S becomes 0, the transistor $M_2$ becomes conductive, so that the output Q becomes 1 irrespective of the reset input R (that is, in the set preference).

The foregoing relations are represented by the truth table in FIG. 5, from which it will be understood that the circuit of the embodiment provides an R-S-S flip-flop circuit. In case of considering these relations, notice should be taken of the fact that the inverted signal S, not the set input S itself, is applied to the gate electrode of the transistor $M_2$.

In accordance with this embodiment as described above, the transistor $M_4$ for resetting is used as a part of the flip-flop circuit body. It can, therefore, make the construction very simple and reduce the number of indispensable transistors to six, in comparison with the circuits as shown in FIGS. 1 and 2*a* in which the gate circuit or transistor for resetting is connected to the external input terminal of the flip-flop circuit body.

FIG. 4 shows a delay type R-S-S flip-flop circuit according to the present invention. This circuit is greatly different from the circuit of FIG. 3 in that a transfer gate transistor $M_{17}$ forming delay means is connected between the output terminal of the first inverter circuit and the input terminal of the second inverter circuit. Consequently, the operation of this circuit differs from that of the circuit of FIG. 3 in that the output Q lags over the inputs S and R, and the essential operation is the same as in the previous embodiment in FIG. 3.

In accordance with this embodiment, the clock control pulse $\phi_{1r}$ as explained with reference to FIGS. 2*a* to 2*c* is not used, and hence, the advantage that the problem of the likelihood of malfunctions as stated in conjunction with these figures can be eliminated is enjoyed in addition to the advantage that the number of elements is diminished.

Although the present invention has thus far been described in connection with the embodiments, it is not restricted to them, but it can adopt various modified means.

For example, it is possible to impress the reset signal R on the transistor $M_3$ (or $M_{13}$) and the output signal of the second inverter circuit on the transistor $M_4$ (or $M_{14}$). In the circuit in FIG. 4, the output signal may be derived from a transfer gate $M_{18}$ in such way that some stages of gate circuits are interposed between the output terminal of the second inverter circuit and the transfer gate.

If another transistor is connected in series or parallel with the transistor $M_2$ (or $M_{12}$) to apply another set input signal, and another transistor is connected in series or parallel with the transistor $M_3$ (or $M_{13}$) to apply another reset input signal, then a multi-input R-S-S flip-flop circuit can be constructed.

What is claimed is:

1. A set preferring R-S flip-flop circuit comprising:

a first inverter circuit having first and second transistors connected in series between its output terminal and a ground terminal;

a second inverter circuit having a third transistor connected between its output terminal and the ground terminal;

first means to transfer an output signal of said first inverter circuit to an input electrode of said third transistor;

second means to feed an output signal of said second inverter circuit back to an input electrode of said first transistor;

a fourth transistor connected between said output terminal of said first inverter circuit and said ground terminal in parallel with said first and second transistors; and third means for applying a reset input signal to an input electrode of said second transistor and a set input signal to an input electrode of said fourth transistor, so as to make said flip-flop circuit have a function that when said fourth transistor is conductive said flip-flop circuit is in a set state irrespective of the reset input signal, and when said fourth transistor is non-conductive said flip-flop circuit remains in the previous state thereof or is in the reset state in accordance with the conductive or non-conductive state of said second transistor, respectively.

2. A set preferring R-S flip-flop circuit as defined in claim 1 wherein one of said first and second means comprises a fifth transistor having its control electrode connected to a source of first pulses.

3. A set preferring R-S flip-flop circuit as defined in claim 2, wherein said fifth transistor is connected between the output of said first inverter circuit and an input electrode of said third transistor.

4. A set preferring R-S flip-flop circuit as defined in claim 3, wherein a sixth transistor is connected to the output of said second inverter circuit and a source of second pulses connected to the control electrode of said sixth transistor.

5. A set preferring R-S flip-flop circuit comprising:

a first inverter circuit having first and second transistors connected in series with a first load across a D.C. power source;

a second inverter circuit having a third transistor connected in series with a second load across said D.C. power source;

first means to transfer an output signal of said first inverter circuit to an input electrode of said third transistor;

second means to feed an output signal of said second inverter circuit back to the input electrode of said first transistor;

a fourth transistor connected between the output of said first inverter circuit and one side of said D.C. power source in parallel with said first and second transistors; and third means for applying a reset input signal to an input electrode of said second transistor and a set input signal to an input electrode of said fourth transistor, so as to make said flip-flop circuit have a function that when said fourth transistor is conductive said flip-flop circuit is in the set state irrespective of the reset input signal, and when said fourth transistor is non-conductive said flip-flop circuit remains in the previous state thereof or is in the reset state in accordance with the conductive or non-conductive state of said second transistor, respectively.

6. A set preferring R-S flip-flop circuit as defined in claim 5 wherein said first means comprises a fifth transistor having its control electrode connected to a source of first pulses.

7. A set preferring R-S flip-flop circuit as defined in claim 6, wherein a sixth transistor is connected to the output of said second inverter circuit and a source of second pulses connected to the control electrode of said sixth transistor.

8. A set preferring R-S flip-flop circuit as defined in claim 7, wherein said first and second loads comprise seventh and eighth transistors having their input electrodes connected to said sources of first and second pulses, respectively.

9. In a flip-flop circuit which comprises a first inverter circuit having first and second transistors connected in series between its output terminal and a ground terminal;

a second inverter circuit having a third transistor connected between its output terminal and said ground terminal;

first means for coupling the output terminal of said first inverter circuit to a control electrode of said third transistor;

second means for feeding a signal at the output terminal of said second inverter circuit back to a control electrode of said first transistor; and a fourth transistor connected between the output terminal of said first inverter circuit and said ground terminal in parallel with said first and second transistors;

the improvement wherein said flip-flop circuit is further interconnected and controlled so as to operate as a set-preferring R-S flip-flop wherein a RESET input signal is applied to a control electrode of said second transistor, and a SET input signal is applied to a control electrode of said fourth transistor, and wherein, upon the conduction of said fourth transistor, said flip-flop circuit is in the SET state irrespective of the RESET input signal, and upon said fourth transistor being rendered non-conductive, said flip-flop circuit remains in its previous state or is in the RESET state in accordance with the conductive or non-conductive state, respectively, of said second transistor.

10. The improvement according to claim 9, wherein one of said first and second means comprises a fifth transistor having its control electrode connected to a source of first pulses.

11. The improvement according to claim 10, wherein said fifth transistor is connected between the output of said first inverter circuit and a control electrode of said third transistor.

* * * * *